UNITED STATES PATENT OFFICE.

HENRY VALENTINE KNAGGS, OF 189 CAMDEN ROAD, COUNTY OF MIDDLESEX, ENGLAND.

OINTMENT.

SPECIFICATION forming part of Letters Patent No. 372,852, dated November 8, 1887.

Application filed February 12, 1887. Serial No. 227,384. (No specimens.) Patented in England November 27, 1886, No. 15,500.

*To all whom it may concern:*

Be it known that I, HENRY VALENTINE KNAGGS, a subject of the Queen of Great Britain, residing at 189 Camden Road, in the county of Middlesex, England, practicing as a physician and surgeon, have invented certain new and useful Improvements in Preparations for Treating Skin Diseases, (for which I have obtained Letters Patent of Great Britain, No. 15,500, dated November 27, 1886;) and I do hereby declare that the following is a full, clear, and exact description of the invention, which will enable others skilled in the art to which it appertains to make and use the same.

The object of my invention is to obtain for the treatment of skin diseases of either trivial or severe character, and whether accompanied or not by a discharge, an emulsion which will secure rest to the patient and protect the diseased parts from the atmosphere in order that they may heal. For cases of severe skin disease which are accompanied by a watery discharge the object is also to obtain a preparation which will become intimately blended with such discharge in such manner as to assist nature in forming a film, crust, or covering which will perform a function similar to that performed by a healthy scab, the curative function of such film, crust, or covering being assisted, if required, by the presence of healing medicaments; but in the trivial cases which are not accompanied by a discharge the formation of this film, crust, or covering is not required.

My invention consists in an emulsion composed of mineral fat, boracic acid, water, and a vegetable gum, in the proportions substantially as hereinafter set forth.

To make the emulsion I first place the mineral fat—soft paraffine or vaseline, for instance—in a warmed mortar or other suitable receptacle to melt it. A small quantity of gum (I prefer powdered gum-acacia) is now added, and the two ingredients are thoroughly incorporated. A little hot water is then added and stirred in until the whole is properly emulsified. To this I now add and mix in a sufficient quantity of a saturated solution of boracic acid to bring the preparation to a suitable consistence, and this serves the twofold purpose of preventing decomposition of the gum and also of beneficially influencing the skin disease for which it is used.

An average emulsion would be composed as follows, viz: one ounce of the completed emulsion would contain half an ounce of soft paraffine, eight grains of boracic acid, eighty grains of powdered gum-acacia, and water enough to make up the weight of one ounce; but the proportions may be varied sufficiently to make a thicker or a more liquid emulsion, as required.

To the above-described emulsion may be added any of the well-known medicaments— such as bismuth-subnitrate, flowers of sulphur, perchloride of mercury, salicylic acid, acetic acid, gelatine, &c.—according to the disease to be treated; or if such medicaments be not required the said emulsion may be applied without them.

I may add that the proportional quantity of boracic acid found to be essential to the successful use of such preparations for external use is somewhat larger than would be usually employed for preserving emulsions to be taken internally.

What I claim as my invention, and desire to secure by Letters Patent, is—

An emulsion for the treatment of skin diseases, consisting of mineral fat, boracic acid, water, and vegetable gum, in proportions substantially as herein set forth.

HENRY VALENTINE KNAGGS.

Witnesses:
WILLIAM SPENCE,
WALTER J. SKERTEN.